US00RE50750E

(19) United States
(12) Reissued Patent
Park

(10) Patent Number: US RE50,750 E
(45) Date of Reissued Patent: Jan. 13, 2026

(54) SIGNALING A SYNCHRONIZATION FRAME TRANSMISSION REQUEST

(71) Applicant: Tahoe Research, Ltd., Dublin (IE)

(72) Inventor: Minyoung Park, Portland, OR (US)

(73) Assignee: Tahoe Research, Ltd., Dublin (IE)

(21) Appl. No.: 15/823,368

(22) Filed: Nov. 27, 2017

Related U.S. Patent Documents

Reissue of:
(64) Patent No.: 9,635,628
Issued: Apr. 25, 2017
Appl. No.: 14/125,636
PCT Filed: May 23, 2013
PCT No.: PCT/US2013/042416
§ 371 (c)(1),
(2) Date: Dec. 12, 2013
PCT Pub. No.: WO2014/116292
PCT Pub. Date: Jul. 31, 2014

U.S. Applications:
(60) Provisional application No. 61/756,548, filed on Jan. 25, 2013.

(51) Int. Cl.
*H04W 72/04* (2023.01)
*H04W 72/0446* (2023.01)
*H04W 56/00* (2009.01)

(52) U.S. Cl.
CPC .... *H04W 72/0446* (2013.01); *H04W 56/0015* (2013.01)

(58) Field of Classification Search
CPC ..... H04W 56/0015; H04W 72/0446
See application file for complete search history.

(56) References Cited

U.S. PATENT DOCUMENTS 6,151,332 A * 11/2000 Gorsuch ..... H04Q 11/0428 370/468
6,272,117 B1 * 8/2001 Choi ..... H04W 74/0866 370/348
8,160,045 B1 * 4/2012 Chhabra ..... H04W 52/0209 370/342
8,203,984 B2 * 6/2012 Gong ..... H04W 52/0216 370/311

(Continued)

FOREIGN PATENT DOCUMENTS

CN 101448313 A 6/2009
CN 107750062 A 3/2018

(Continued)

OTHER PUBLICATIONS

Office Action received for Chinese Patent Application No. 201380067985.3, mailed on Sep. 5, 2018, 6 pages.

(Continued)

*Primary Examiner* — Joseph R Pokrzywa
(74) *Attorney, Agent, or Firm* — Studebaker Brackett PLLC

(57) ABSTRACT

Various embodiments of the invention describe a format and procedure for a wireless communication device to request a network controller to transmit a synchronization frame so that the device may synchronize its communication activities with the network controller. This operation may be used in various types of wireless networks, such as but not limited to those conforming to IEEE standard 802.11ah.

23 Claims, 5 Drawing Sheets

(56) References Cited

U.S. PATENT DOCUMENTS

| | | | | |
|---|---|---|---|---|
| 9,191,890 | B2 * | 11/2015 | Jafarian | H04W 52/0209 |
| 9,226,233 | B2 * | 12/2015 | Liu | H04W 52/0229 |
| 9,276,709 | B2 * | 3/2016 | Mazzarese | H04L 5/0048 |
| 9,585,091 | B2 * | 2/2017 | Jafarian | H04W 52/0293 |
| 9,635,628 | B2 | 4/2017 | Park et al. | |
| 2005/0068928 | A1 * | 3/2005 | Smith | H04W 48/16 370/338 |
| 2007/0050523 | A1 * | 3/2007 | Emeott | H04W 56/001 709/248 |
| 2007/0242634 | A1 * | 10/2007 | Calcev | H04W 52/0225 370/318 |
| 2010/0061347 | A1 * | 3/2010 | Bracha | H04W 56/0015 370/336 |
| 2010/0080181 | A1 | 4/2010 | Yamada et al. | H04W 56/0055 370/329 |
| 2010/0153762 | A1 * | 6/2010 | Radulescu | H04M 1/7253 713/323 |
| 2010/0157863 | A1 * | 6/2010 | Gong | G06F 1/3209 370/311 |
| 2010/0309929 | A1 | 12/2010 | Gao et al. | H04W 56/0005 370/503 |
| 2013/0235860 | A1 * | 9/2013 | Vermani | H04W 40/02 370/338 |
| 2013/0279382 | A1 | 10/2013 | Park et al. | |

FOREIGN PATENT DOCUMENTS

| | | | |
|---|---|---|---|
| WO | 2006124840 | A1 | 11/2006 |
| WO | 2010027529 | A1 | 3/2010 |
| WO | 2014/116292 | A1 | 7/2014 |

OTHER PUBLICATIONS

Park et al., "AP Assisted Medium Synchronization," Power-point presentation, Sep. 2012, 16 pages, 802.11-12/0840r1, IEEE.

First Office Action mailed on Mar. 3, 2020, to CN Patent Application No. 201710991211.X.

Office Action received for Chinese Patent Application No. 201380067985.3, mailed on Dec. 19, 2017, 7 pages.

Merlin, et al., "Very Low Energy Paging," Nov. 2012, 15 pages, 802.11-12/1324r0, IEEE.

Fischer, et al., "Target Wake Times," Jul. 2012, 16 pages, 802.11-12/0823r0, IEEE.

Office Action received for Chinese Patent Application No. 201380067985.3, mailed on Feb. 3, 2019, 3 pages.

Notice of Allowance received for European Patent Application No. 13872725.0 mailed on Mar. 21, 2019, 2 pages.

International Search Report and Written Opinion received for PCT Patent Application No. PCT/US2013/042416, mailed on Oct. 23, 2013, 10 pages.

Sharp, 'Detection of Out of UL Sync', R2-072377, 3GPP TSG RAN WG2#58bis, Orlando, FL, USA, Jun. 25-29, 2007, pp. 1-3.

Sharp, "UL Sync Request", R2-072378, 3GPP TSG-RAN IG2#58bis, Orlando, FL, USA, Jun. 25-29, 2007, pp. 1-3.

NTT Docomo, Inc., "Uplink synchronization maintenance", R2-072014 3PP TSG RAN WG2 #58 Kobe, Japan, May 7-11, 2007, 3 Pages.

Office Action received for Taiwan Patent Application No. 103102094, mailed on Apr. 16, 2015, 7 pages of Taiwan Office Action and 1 page of English Search Report.

* cited by examiner

SIGNALING A SYNCHRONIZATION FRAME TRANSMISSION REQUEST

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application is derived from U.S. provisional application Ser. No. 61/756,548, filed Jan. 25, 2013, and claims priority to that filing date for all applicable subject matter.

BACKGROUND

A wireless communication device that is associated with a wireless network may sometimes go into a low power state to conserve battery power. However, upon transitioning from the low power state back to the awake state, the device may need to re-synchronize its activities with the network controller that schedules communications within the network. Waiting for the next beacon frame may cause an unacceptable delay in such re-synchronizing. The network controller can reduce this delay by sending a synchronization (sync) frame to the device to enable synchronization, but an excessive amount of time may pass before this happens, unless the device requests a sync frame. Current communication protocols don't define such a request.

BRIEF DESCRIPTION OF THE DRAWINGS

Some embodiments of the invention may be better understood by referring to the following description and accompanying drawings that are used to illustrate embodiments of the invention. In the drawings.

DETAILED DESCRIPTION

Figure 1:
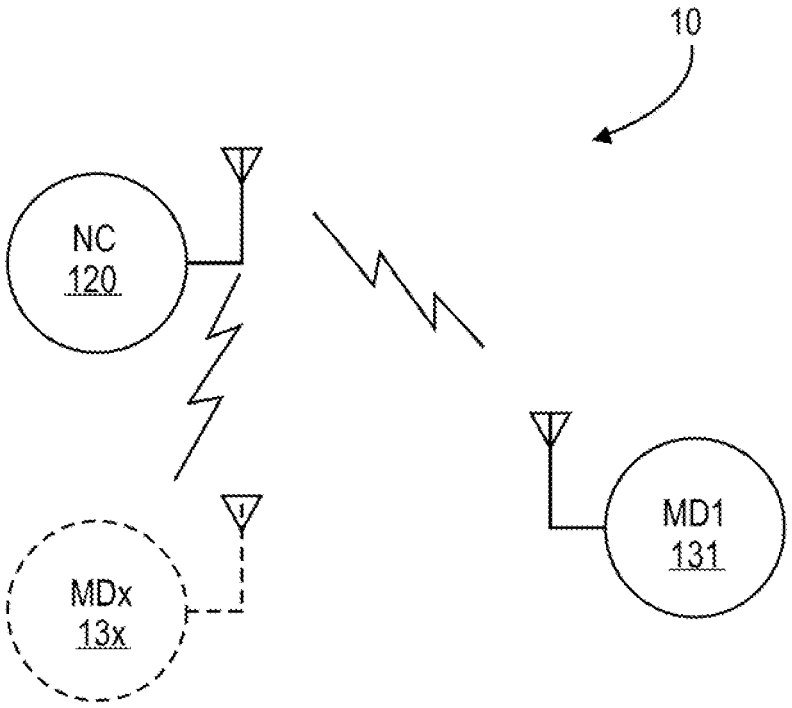
FIG. 1 shows a network, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Various labels may be used in describing particular devices, software, functions, etc. These are used for simplicity and convenience, but this should not be interpreted to mean that only items with those labels are covered by the description. Devices, software, functions, etc., that perform in the same manner as the described items, but are labeled with different terminology, should be considered to be equivalent to the described items.

Various embodiments of the invention may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "wireless" may be used to describe circuits, devices, systems, methods, techniques, communications channels, etc., that communicate data by using modulated electromagnetic radiation through a non-solid medium. A wireless device may comprise at least one antenna, at least one radio, at least one memory, and at least one processor, where the radio(s) transmits signals through the antenna that represent data and receives signals through the antenna that represent data, while the processor(s) may process the data to be transmitted and the data that has been received. The processor(s) may also process other data which is neither transmitted nor received.

As used within this document, the term "network controller" is intended to cover a device that schedules and controls, at least partially, wireless communications by other devices in the network. A network controller may also be known as a base station (BS), access point (AP), central point (CP), or any other term that may arise to describe the functionality of a network controller.

As used within this document, the term "mobile device" is intended to cover those devices whose wireless communications are at least partially scheduled and controlled by the network controller. A mobile device (MD) may also be known as a mobile station (MS), STA, subscriber station (SS), user equipment (UE), or any other term that may arise to describe the functionality of a mobile device. Mobile devices may move during such communications, but movement is not required.

As used within this document, the term "communicate" is intended to include transmitting and/or receiving. This may be particularly useful in claims when describing the organization of data that is being transmitted by one device and received by another, but only the functionality of one of those devices is required to infringe the claim. Similarly, the exchange of data between a network controller and a mobile device (both devices transmit and receive during the exchange) may be described as 'communicating', when only the functionality of one of those devices is being claimed.

Some embodiments of the invention describe one or more methods of transmitting a request to a network controller for a synchronization (sync) frame. The network controller may then transmit the sync frame, thus permitting the mobile device to synchronize its communication activities with those of the network controller.

FIG. 1 shows a network, according to an embodiment of the invention. In network 10, network controller (NC) 120 may control the overall communications between itself and mobile device (MDI) 131. NC 120 may also control communication between itself and one or more other mobile devices (MDx) 13x, shown with a dashed line. The functionality described herein may also apply to those other devices 13x, but for simplicity the description covers one mobile device communicating with one network controller.

Figure 2:
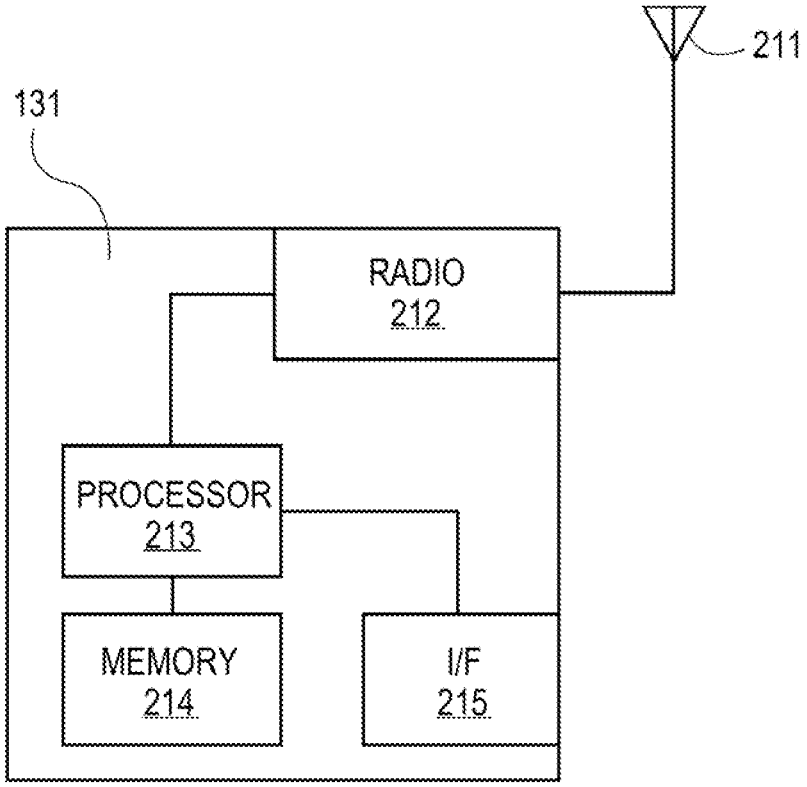
FIG. 2 shows a wireless communication device, according to an embodiment of the invention.

FIG. 2 shows a wireless communication device, according to an embodiment of the invention. Although the illustrated wireless communication device is labeled as mobile device 131, the same general configuration may be applied to network controller 120 or any other feasible wireless communication device. Mobile device 131 is shown with one or more antennas 211, one or more radios 212, one or more processors 213, one or more memories 214, and one or more user interfaces 215. These components may be coupled together in any feasible manner. In addition to the physical components shown, device 131 may also be configured into various functional components, such as software, a medium access control (MAC) layer, a physical medium access (PHY) layer, an application layer, and others. These will not be further described in this document unless such a description would increase an understanding of the various embodiments of the invention by a person of ordinary skill in the art.

Figure 3:
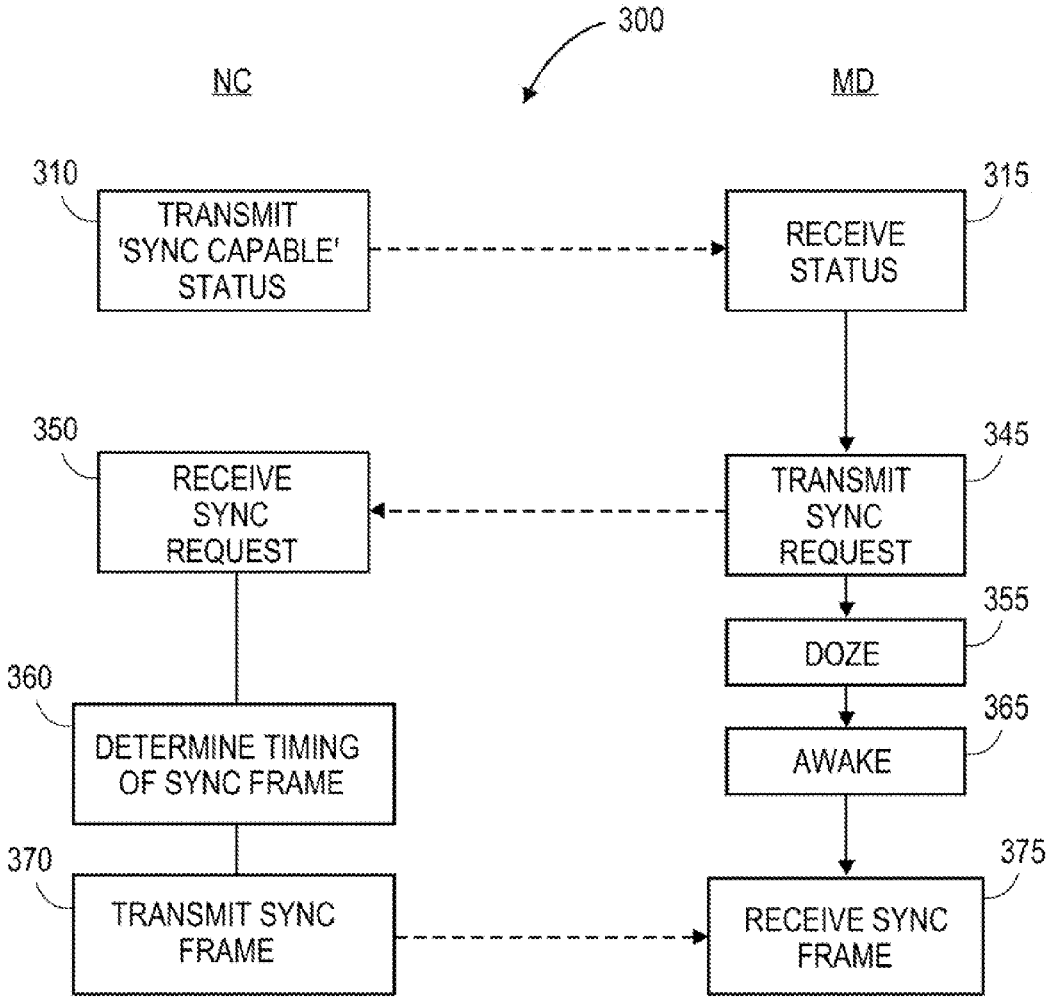
FIG. 3 shows a flow diagram of a method of communicating a sync frame, according to an embodiment of the invention.

FIG. 3 shows a flow diagram of a method of communicating a sync frame, according to an embodiment of the invention. In flow diagram 300, at 310 a network controller may transmit its Sync Capable status by transmitting an indication of whether it's able to transmit a sync frame. This indication may be transmitted in various types of frames, including but not limited to a Beacon frame or a Probe Response frame. Alternately, the network controller may transmit an indication that it is not able to transmit a sync frame, but this flow diagram assumes that it is capable of transmitting a sync frame. The mobile device is shown receiving that status at 315, and the subsequent operations in FIG. 3 are based on the assumption that this status does not change; i.e., that the network controller is capable of transmitting a sync frame throughout the operations of FIG. 3.

Before entering a low power state, the mobile device may want to assure that the network controller transmits a sync frame shortly after the mobile device is scheduled to wake up. (The low power state is described here as a 'doze' state, although the embodiments of the invention are not limited to low power states that are described with that term.) Therefore, before entering the low power state, the mobile device may transmit a sync request to the network controller at 345, requesting that the network controller transmit a sync frame at a predictable time. The mobile device may subsequently enter the doze state at 365.

The network controller may receive the sync request at 350, and based on that request may determine at 360 when the sync frame is to be transmitted. In some embodiments, this timing may be based on a prearranged assumption. For example, it may be transmitted at the next slot boundary after the mobile device wakes up. This assumes that the mobile device and network controller have communicated enough that they both know when the mobile device will wake up.

The mobile device may resume an operational awake state at 365. Since the mobile device has been dozing and unable to monitor network communications, after awakening it may need to synchronize on the network communications so that it will know when to transmit a frame without causing collisions with other ongoing transmissions. It would be possible to simply wait until a synchronizing event is received, such as a new frame transmitted in the normal course of network communications, but this might require waiting for an unacceptably long period of time. Also, waiting and monitoring may require using additional battery power without the benefit of being able to effectively communicate.

Therefore, at 370 the network controller may transmit the sync frame at the designated time, and the mobile device may receive it at 375, thus permitting the mobile device to synchronize itself on network communications.

Figure 4:
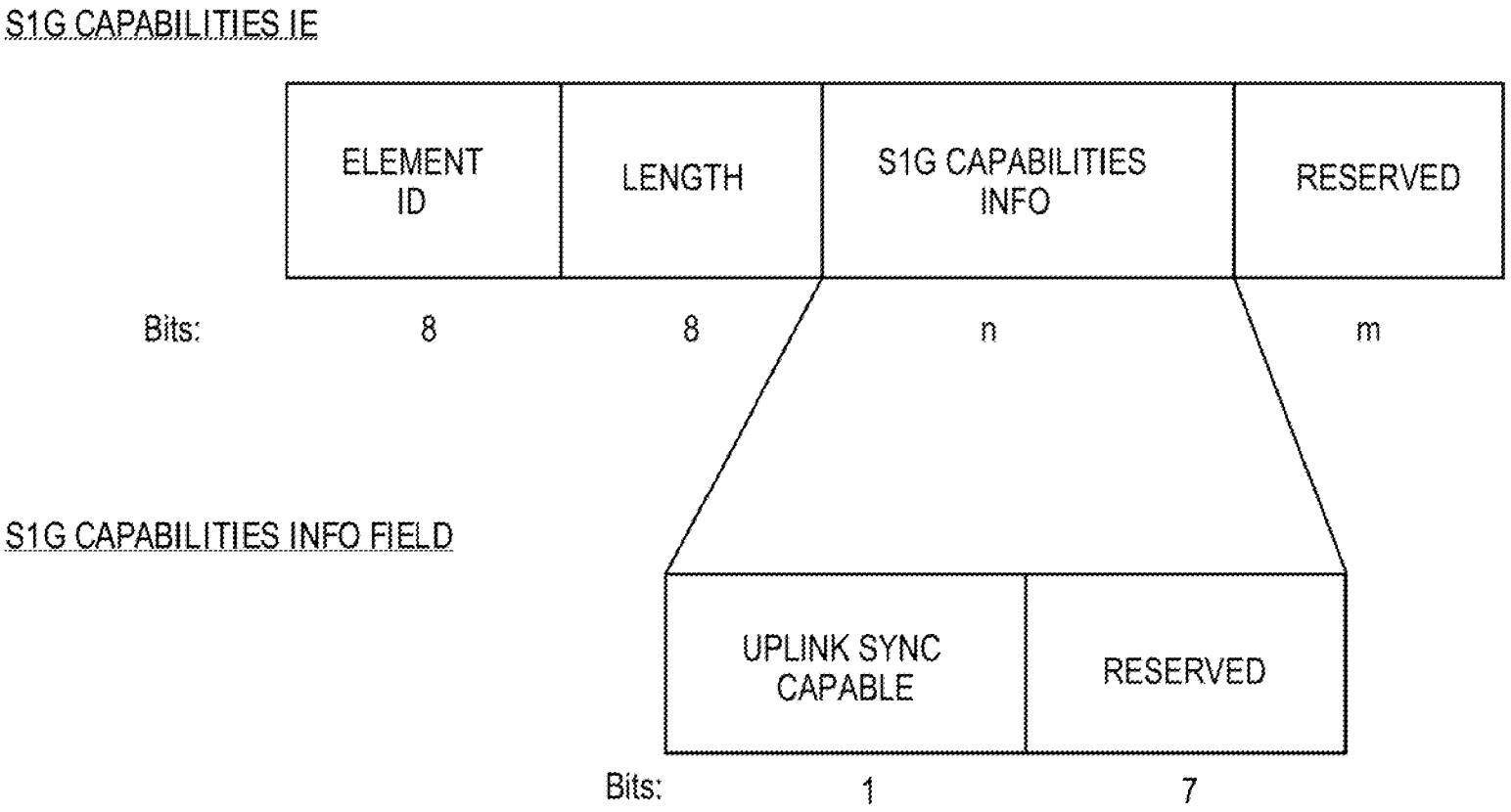
FIG. 4 shows a diagram of a capabilities information element, according to an embodiment of the invention.

FIG. 4 shows a diagram of a capabilities information element, according to an embodiment of the invention. As previously described for the beginning of the flow diagram in FIG. 3, the network controller may transmit an indication of whether or not it will support a sync frame. In some embodiments, this indication may be made in an information element (IE). Such an IE is shown as the SIG Capabilities IE in FIG. 4. This IE may be contained in various types of frames, such as but not limited to a Beacon frame or a Probe Response frame.

In the illustrated embodiment, the IE begins with a 1-byte Element ID field, which contains a value to indicate this is a SIG Capabilities IE. The next field may be a 1-byte Length field to indicate the length of the IE. The next field is shown as a SIG Capabilities Info field, which may have any feasible number (n) of bytes, followed by another field of m bytes, which may be reserved for future use. The illustrated SIG Capabilities Info field is shown as consisting of 1 byte, with the first bit being shown as an Uplink Sync Capable field, and the remaining 7 bits being reserved for future use. In some embodiments, the Uplink Sync Capable field will contain a value of '1' to indicate the network controller will support transmitting a sync frame, and a value of '0' to indicate the network controller will not support transmitting a sync frame, but other values may be used instead.

Although various field lengths and field names have been shown in this embodiment, other field lengths and other field names may also be used, as long as they perform the same function and indicate the same information.

Figure 5:
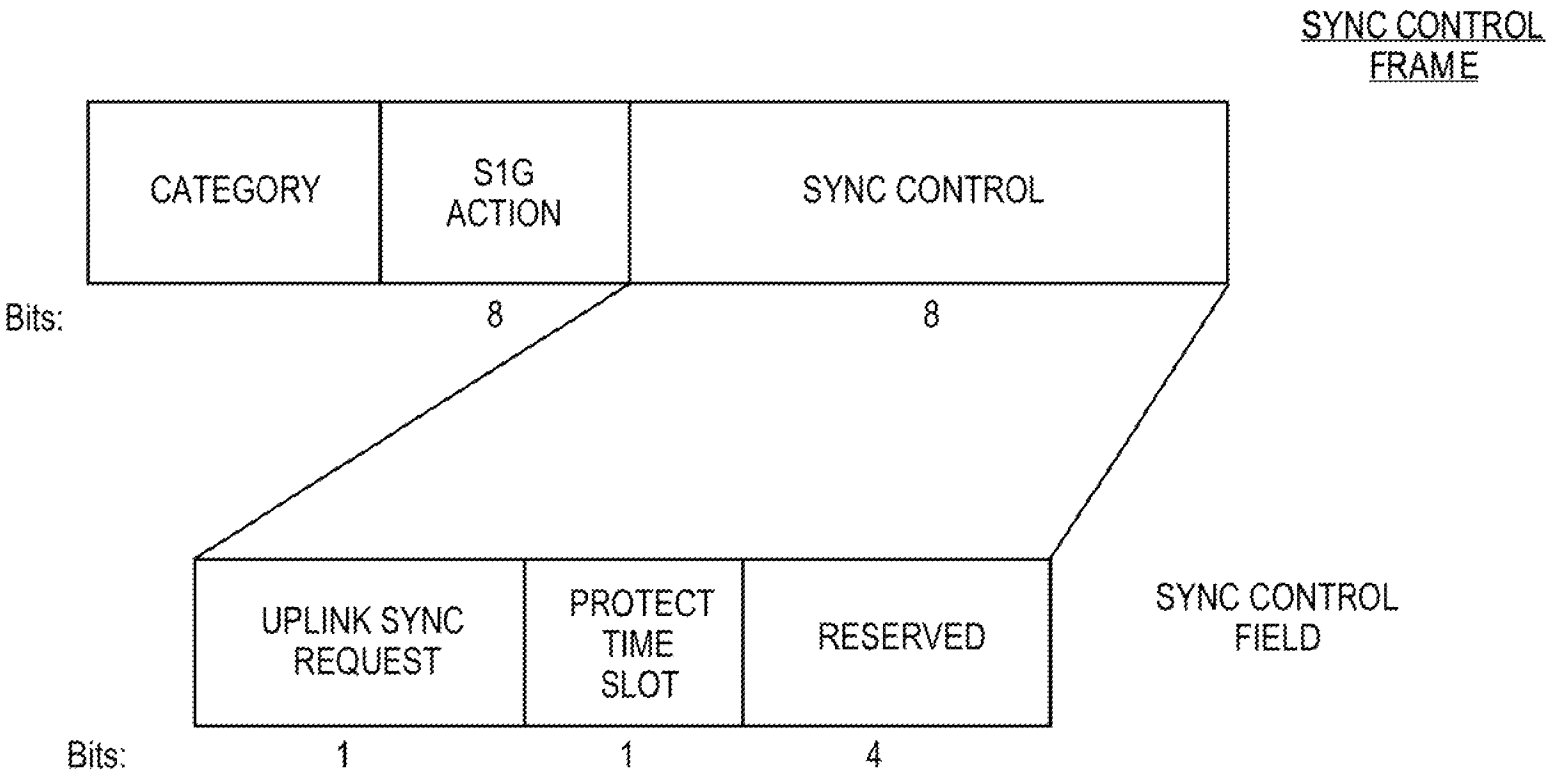
FIG. 5 shows a diagram of a sync control frame, according to an embodiment of the invention.

FIG. 5 shows a diagram of a sync control frame, according to an embodiment of the invention. As previously described for the Sync Request in FIG. 3, the mobile device may transmit a request to the network controller to transmit a sync frame. An embodiment of such a request is shown as the Sync Control Frame of FIG. 5. In some embodiments the Sync Control Frame may be a form of Action Frame. In some embodiments, the SIG Action field may be used to indicate that this is a Sync Control Frame, and the Sync Control field may be used to indicate that this is a request. In the illustrated embodiment, the Sync Control field has a 1-bit Uplink Sync Request field, and a 1-bit Protect Time Slot field. In a particular embodiment, a value of '1' in the Uplink Sync Request field may be used to indicate the mobile device is requesting a sync frame, and a value of '0' may be used to indicate the mobile device does not wish to receive a sync frame.

In an alternate embodiment, the mobile device may request a sync frame by transmitting the SIG Capabilities IE of FIG. 4 to the network controller, with a value of '1' in the Uplink Sync Capable field indicating a request.

The Protect Time Slot field, if it is used, may indicate whether the mobile device wants to protect its allocated time slot in a Restricted Access Window or a Target Wake time. In some embodiments, a value of '1' in this field may indicate the mobile device wants to protect its time slot, while a value of '0' may indicate it does not.

The foregoing description is intended to be illustrative and not limiting. Variations will occur to those of skill in the art. Those variations are intended to be included in the various embodiments of the invention, which are limited only by the scope of the following claims.

What is claimed is:

1. A first wireless communication device [having] *comprising* a processor, a memory, and a radio, *wherein* the first *wireless communication* device [configured to] *further comprises*:

[transmit] *a transmitter capable of transmitting* a sync request frame [between], *the sync request frame comprising a 1-bit field indicating that the first wireless communication device is requesting a sync frame, from* the first wireless communication device [and] *to* a second wireless communication device, the sync request frame formatted as a request *for the second wireless communication device* to transmit a sync frame *to the first wireless communication device after the first wireless communication device exits a low power state*; and

[receive] *a receiver capable of receiving* the sync frame[;] *sent by the second wireless communication device at a time selected based in part on information included in the sync request frame,* wherein the *first wireless communication device is configured to transmit the* sync request frame [is transmitted just] before the first *wireless communication* device enters [a] *the* low power state [and requests transmission of a sync frame after the first device exits low power state], *and is further configured to enter the low power state after transmitting the sync request frame.*

2. The first *wireless communication* device of claim 1, wherein: the first *wireless communication* device is a mobile device; *and* the second *wireless communication* device is a network controller[; said communicating the sync request frame includes transmitting the sync request frame; and said communicating the sync frame includes receiving the sync frame].

3. The first *wireless communication* device of claim 1, wherein: the first *wireless communication* device is a network controller; *and* the second *wireless communication* device is a mobile device[; said communicating the sync request frame includes receiving the sync request frame; and said communicating the sync frame includes transmitting the sync frame].

4. The first *wireless communication* device of claim 1, wherein the [sync request frame includes] *1-bit field is* an Uplink Sync Request field [to indicate whether a sync frame is being requested].

5. The first *wireless communication* device of claim 4, wherein the Uplink [sync] *Sync* Request field is contained within a Sync Control field of an action frame.

6. The first *wireless communication* device of claim 1, wherein the first *wireless communication* device is further *configured* to communicate a capabilities information element prior to [communicating] *transmitting* the sync request frame, the capabilities information element indicating whether transmitting sync frames is supported.

7. The first *wireless communication* device of claim 6, wherein the capabilities information element includes an Uplink Sync Capable field indicating whether transmitting sync frames is supported.

8. The first *wireless communication* device of claim 6, wherein: the first *wireless communication* device is a network controller; and said communicating [a] *the* capabilities information element includes transmitting the capabilities information element.

9. The first *wireless communication* device of claim 6, wherein: the first *wireless communication* device is a mobile device; *and* said communicating [a] *the* capabilities information element includes receiving the capabilities information element[; and said communicating the sync request frame includes transmitting the sync request frame].

[10. The first device of claim 9, wherein the first device is to enter a low power mode subsequent to transmitting the sync request frame.]

11. A method of communicating by a first wireless [communications] *communication* device in a wireless communications network, comprising:

transmitting a sync request frame [between], *the sync request frame comprising a 1-bit field indicating that the first wireless communication device is requesting a sync frame, from* the first *wireless communication* device [and] *to* a second wireless communication device, the sync request frame formatted as a request *for the second wireless communication device* to transmit a sync frame[; and] *to the first wireless communication device after the first wireless communication device exits a low power state,* receiving the sync frame[;], *at the first wireless communication device, the sync frame sent by the second wireless communication device at a time selected based in part on information included in the sync request frame,* wherein *in transmitting the sync request frame,* the sync request frame is transmitted [just] before the first *wireless communication* device enters [a] *the* low power state [and requests transmission of a sync frame after the first device exits low power state], *and the first*

*wireless communication device enters the low power state after transmitting the sync request frame.*

[12. The method of claim 11, wherein: said communicating the sync request frame includes transmitting the sync request frame; and said communicating the sync frame includes receiving the sync frame.]

[13. The method of claim 11, wherein: said communicating the sync request frame includes receiving the sync request frame; and said communicating the sync frame includes transmitting the sync frame.]

14. The method of claim 11, wherein the [sync request frame includes] *1-bit field is* an Uplink Sync Request field [to indicate whether a sync frame is being requested].

15. The method of claim 14, wherein the Uplink Sync Request field is contained within a Sync Control field of an action frame.

16. The method of claim 11, further comprising communicating a capabilities information element prior to [communicating] *transmitting* the sync request frame, the capabilities information element indicating whether transmitting sync frames is supported.

17. The method of claim 16, wherein the capabilities information element includes an Uplink Sync Capable field indicating whether transmitting sync frames is supported.

18. The method of claim 16, wherein said communicating the capabilities information element includes transmitting the [c:apabilities] *capabilities* information element.

19. The method of claim 16, wherein said communicating the capabilities information element includes receiving the capabilities information element.

[20. The method of claim 19, further comprising entering a low power mode subsequent to communicating the sync request frame.]

21. A computer-readable non-transitory storage medium that contains instructions, the instructions executed by one or more processors, causing the one or more processors to perform operations [comprising:)] *comprising:* wirelessly transmitting a sync request frame*, the sync request frame comprising a 1-bit field indicating that a first wireless communication device is requesting a sync frame, from the first wireless communication device to a second wireless communication device*, the sync request frame formatted as a request *for the second wireless communication device* to transmit a sync frame *to the first wireless communication device after the first wireless communication device exits a low power state*; and wirelessly receiving*, at the first wireless communication device,* the sync frame[;] *sent by the second wireless communication device at a time selected based in part on information included in the sync request frame,* wherein *in wirelessly transmitting the sync request frame,* the *first wireless communication device transmits the* sync request frame [is transmitted just] before the first *wireless communication* device enters [a] *the* low power state [and requests transmission of a sync frame after the first device exits low power state]*, and the first wireless communication device enters the low power state after transmitting the sync request frame.*

[22. The medium of claim 21, wherein: said communicating the sync request frame includes transmitting the sync request frame; and said communicating the sync frame includes receiving the sync frame.]

[23. The medium of claim 21, wherein: said communicating the sync request frame includes receiving the sync request frame; and said communicating the sync frame includes transmitting the sync frame.]

24. The *storage* medium of claim 21, wherein the [sync request frame includes] *1-bit field is* an Uplink Sync Request field [to indicate whether a sync frame is being requested].

25. The *storage* medium of claim 24, wherein the Uplink Sync Request field is contained within a Sync Control field of an action frame.

26. The *storage* medium of claim 21, wherein the operations further comprise communicating a capabilities information element prior to [communicating] *transmitting* the sync request frame, the capabilities information element indicating whether transmitting sync frames is supported.

27. The *storage* medium of claim 26, wherein the capabilities information element includes [are] *an* Uplink Sync Capable field indicating whether transmitting sync frames is supported.

28. The *storage* medium of claim 26, wherein said communicating the capabilities information element includes transmitting the capabilities information element.

29. The *storage* medium of claim 26, wherein said communicating the capabilities information element includes receiving the capabilities information element.

[30. The medium of claim 29, wherein the operations further comprise entering a low power mode subsequent to communicating the sync request frame.]

* * * * *